(No Model.)

A. J. MUNSON.
BALL ORNAMENT FOR LIGHTNING RODS, &c.

No. 355,655. Patented Jan. 4, 1887.

Witnesses:

Inventor:

UNITED STATES PATENT OFFICE.

ALVIN J. MUNSON, OF INDIANAPOLIS, INDIANA.

BALL ORNAMENT FOR LIGHTNING-RODS, &c.

SPECIFICATION forming part of Letters Patent No. 355,655, dated January 4, 1887.

Application filed June 18, 1886. Serial No. 205,556. (No model.)

*To all whom it may concern:*

Be it known that I, ALVIN J. MUNSON, a citizen of the United States, residing at Indianapolis, in the State of Indiana, have invented new and useful Improvements in Ball Ornaments for Lightning-Rods and Similar Devices, of which the following is a specification.

I have improved the glass ball ornament for lightning-rods and flag-staffs, in which the ball is hollow and colored on its interior surface by silvering, or by a combination of colors to render it ornamental.

The object of my improvement is to preserve the interior gilded surface from defacement by dirty water running down into the interior of the ball, and to prevent the entrance of water therein, which would be liable to freeze and to break the ball.

By my improvement a separate glass tube forms the means by which the ball is attached to the rod, while screw-caps and rubber washers serve to seal the joining of the glass tube with the ball and with the rod at the openings in the ball.

Figure 1:
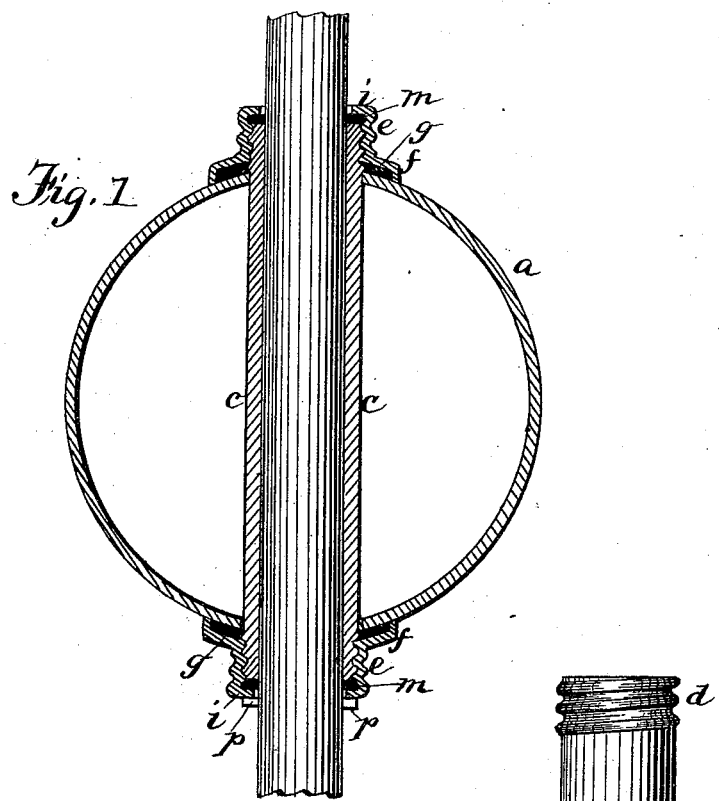
Figure 2:
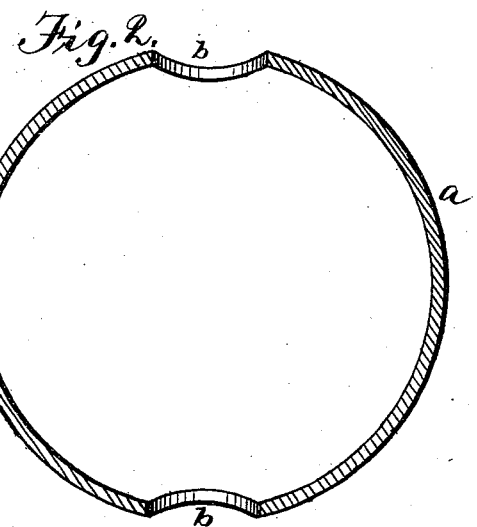
Figure 3:
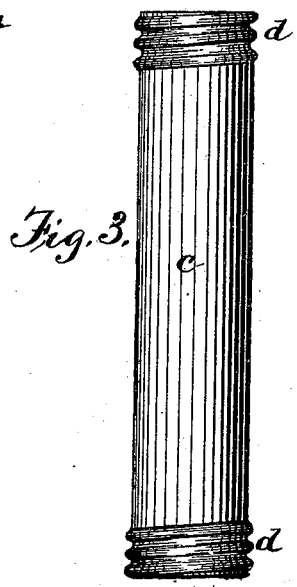

Referring to the drawings, Figure 1 represents a vertical central section of my improved ornamental glass ball as applied to a rod. Fig. 2 shows the ball in section, and Fig. 3 shows the separate screw-threaded glass tube.

The ball $a$ is of glass with diameter openings $b\ b$, through which its interior is colored, or silvered and gilded, as may be desired, and through which passes a glass tube, $c$, having a length sufficient to project a short distance at each end beyond the surface of the ball. The tube has formed upon its outer surface, at each end, a screw-thread, $d$, to receive a screw-cap, $e$, preferably of thin spun metal. Each cap has a base-rim, $f$, which screws upon a rubber washer, $g$, placed upon the ball around the joint of the tube therewith, while an inward-projecting rim, $i$, at the outer end of the cap, screws upon a washer, $m$, at the outer end of the tube, whereby the joints formed by the tube at the openings of the ball, and the joints formed by the ends of the tube at the open ends of the caps, are sealed against the entrance of water running down the rod, and the interior ornamented surface of the ball is thus kept free from dirt and water. The spun caps are made to bring their rims hard upon their washers when screwed home upon the ball, and the length of the tube is governed thereby. The glass ball and tube may be made of any desired thickness.

The ball is secured upon the rod by a shoulder, pin, or other seating, $p$, as in Fig. 1. I prefer to make the tube of glass to avoid interior discoloration from rusting; but it may be made of any suitable material and sealed by any suitable substance.

I claim—

1. The combination, with a lightning-rod or similar device, of a hollow glass ball having its interior walls ornamented, a separate glass tube, and means whereby the two parts are secured together and the joints of the ball and tube sealed against the entrance of water within the ball, substantially as described.

2. A ball ornament for lightning-rods and similar devices, consisting of the hollow glass ball having diameter openings, in combination with a separate tube having outer surface screw-threads at each end, the screw-caps, and the washers, substantially as described.

In testimony whereof I have hereunto set my hand in the presence of two subscribing witnesses.

ALVIN J. MUNSON.

Witnesses:
 HORACE SPEED,
 DAVID R. MUNSON.